US012708592B1

(12) United States Patent
Adams et al.

(10) Patent No.: US 12,708,592 B1
(45) Date of Patent: Aug. 18, 2026

(54) CUSTOMIZED PACIFIER CREATION KIT

(71) Applicants: Veronica Lynn Adams, Yulee, FL (US); Lori Ann Mooney, Yulee, FL (US); James Patrick Mooney, Yulee, FL (US)

(72) Inventors: Veronica Lynn Adams, Yulee, FL (US); Lori Ann Mooney, Yulee, FL (US); James Patrick Mooney, Yulee, FL (US)

( * ) Notice: Subject to any disclaimer, the term of this patent is extended or adjusted under 35 U.S.C. 154(b) by 119 days.

(21) Appl. No.: 18/627,079

(22) Filed: Apr. 4, 2024

(51) Int. Cl.
*A61J 17/00* (2006.01)

(52) U.S. Cl.
CPC ......... *A61J 17/001* (2015.05); *A61J 17/1011* (2020.05)

(58) Field of Classification Search
None
See application file for complete search history.

(56) References Cited

U.S. PATENT DOCUMENTS 1,023,822 A * 4/1912 Dubay .................... A61J 17/02 606/235
4,676,386 A * 6/1987 Phlaphongphanich ...................... A61J 11/006 215/11.1
5,108,686 A * 4/1992 Griffin .................... A61J 17/10 215/11.1
5,275,619 A * 1/1994 Engebretson ........... A61J 17/10 606/236
9,044,379 B2 6/2015 Sabree et al.
10,016,342 B2 * 7/2018 Kempker ............... A61J 11/005
12,343,313 B2 * 7/2025 Smith ................... A61J 17/105
2005/0210652 A1 * 9/2005 Epstein .................. A61H 13/00 2/21
2006/0201901 A1 * 9/2006 Sabree .................. A61J 17/001 215/11.1
2008/0308450 A1 * 12/2008 Tchouangang ....... A61C 19/066 206/570
2008/0314776 A1 * 12/2008 Cooke .................... A61J 11/005 264/222
2013/0245687 A1 * 9/2013 Bachmann .............. A61J 17/02 606/235
2016/0101025 A1 * 4/2016 Kempker ............... A61J 11/005 264/222
2017/0020788 A1 * 1/2017 Malone ................ A61J 17/1011
2017/0312186 A1 * 11/2017 Lofaro ................ B29C 33/3878
2019/0307650 A1 * 10/2019 Dentz ................... A61J 17/109
2020/0315922 A1 * 10/2020 Zarda ................... A61J 17/1011
2022/0249204 A1 * 8/2022 Simon Tuma ........... A61C 9/00

FOREIGN PATENT DOCUMENTS

CN 101938969 A * 1/2011 .......... A61J 11/0065
WO WO-2012139111 A1 * 10/2012 ............. A46B 5/023

* cited by examiner

*Primary Examiner* — Shaun L David
(74) *Attorney, Agent, or Firm* — Sanchelima & Associates, P.A.; Christian Sanchelima; Jesus Sanchelima

(57) ABSTRACT

A customized pacifier creation kit including a kit assembly and a base assembly. The kit assembly includes a mold container and a silicone container. The mold container has a mold that can be formed with the shape of a finger of a user to receive silicone from the silicone container to form a soothing device with a form of the finger of the user. The base assembly includes a base having an electronic sound producing mechanism. The base is attached to the soothing device.

3 Claims, 5 Drawing Sheets

CUSTOMIZED PACIFIER CREATION KIT

BACKGROUND OF THE INVENTION

1. Field of the Invention

The present invention relates to a pacifier creation kit and, more particularly, to a customized pacifier creation kit that allows the creation of customized soothing devices for infants.

2. Description of the Related Art

Several designs for pacifier creation kits have been designed in the past. None of them, however, include a customized pacifier creation kit that includes a silicone to create customized soothing devices and further including a speaker.

Applicant believes that a related reference corresponds to U.S. Pat. No. 9,044,379 issued for a customized nipple for a pacifier baby bottle that is formed from a mold of the mother's breast, nipple, and areola area. Applicant believes that another related reference corresponds to U.S. Pat. No. 5,108,686 issued for a method for using a mold to create replica human nipple for a nursing device. None of these references, however, teach of a customized pacifier creation kit that comprises a kit containing a mold, silicone, and instructions for forming a customized silicone mold of a person's finger, which is used to form an infant soothing device having an electronic sound producing mechanism in the base.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a customized pacifier creation kit that allows a user to make a mold of a finger to create personal pacifiers for an infant.

It is another object of this invention to provide a customized pacifier creation kit that includes a programmable speaker to sound programmed voices.

It is still another object of the present invention to provide a customized pacifier creation kit that permits the creation of customizable soothing devices.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
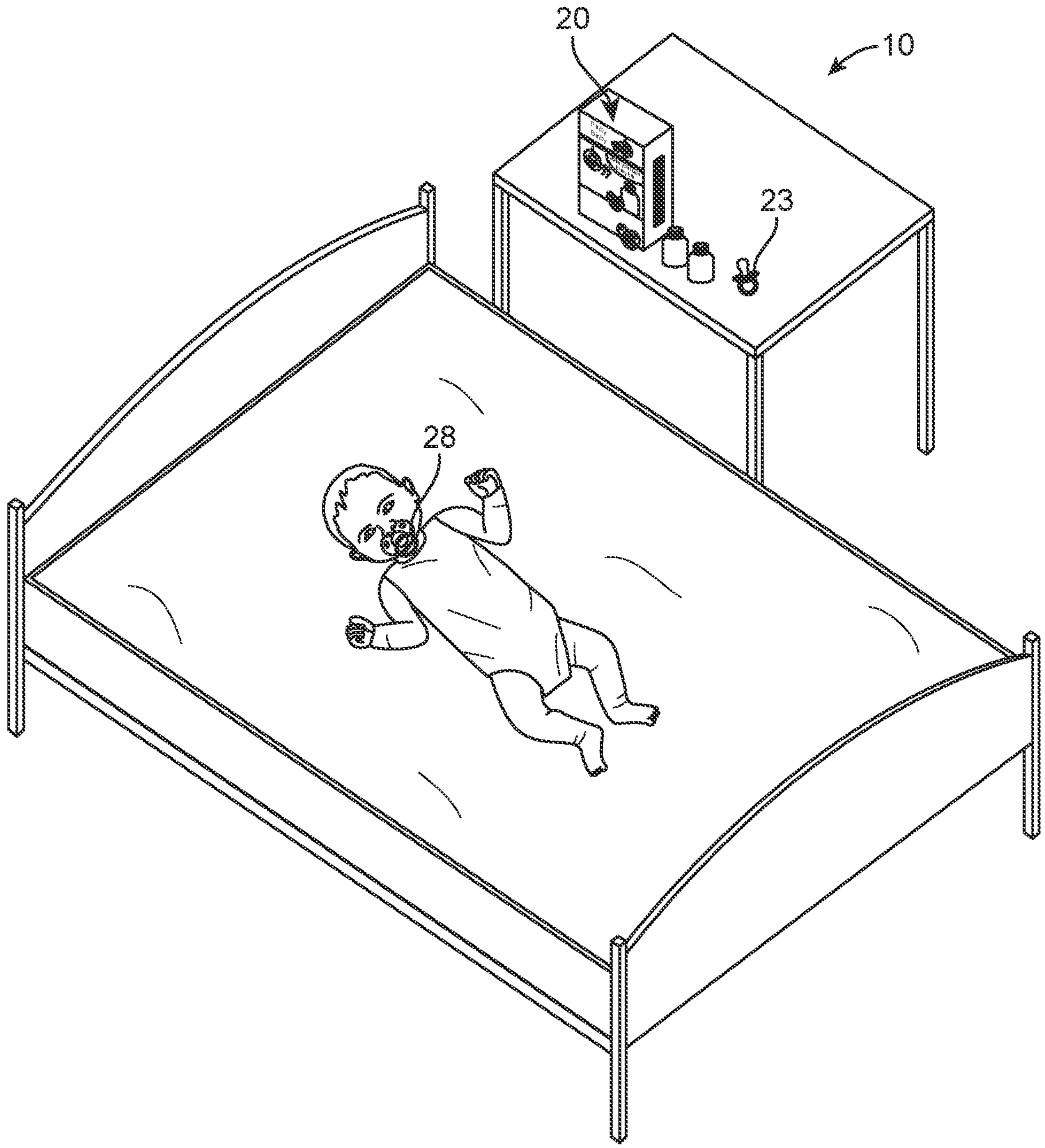
FIG. 1 represents an isometric operational view of the present invention 10 with an infant using one of the pacifiers of the kit assembly 20.
Figure 2:
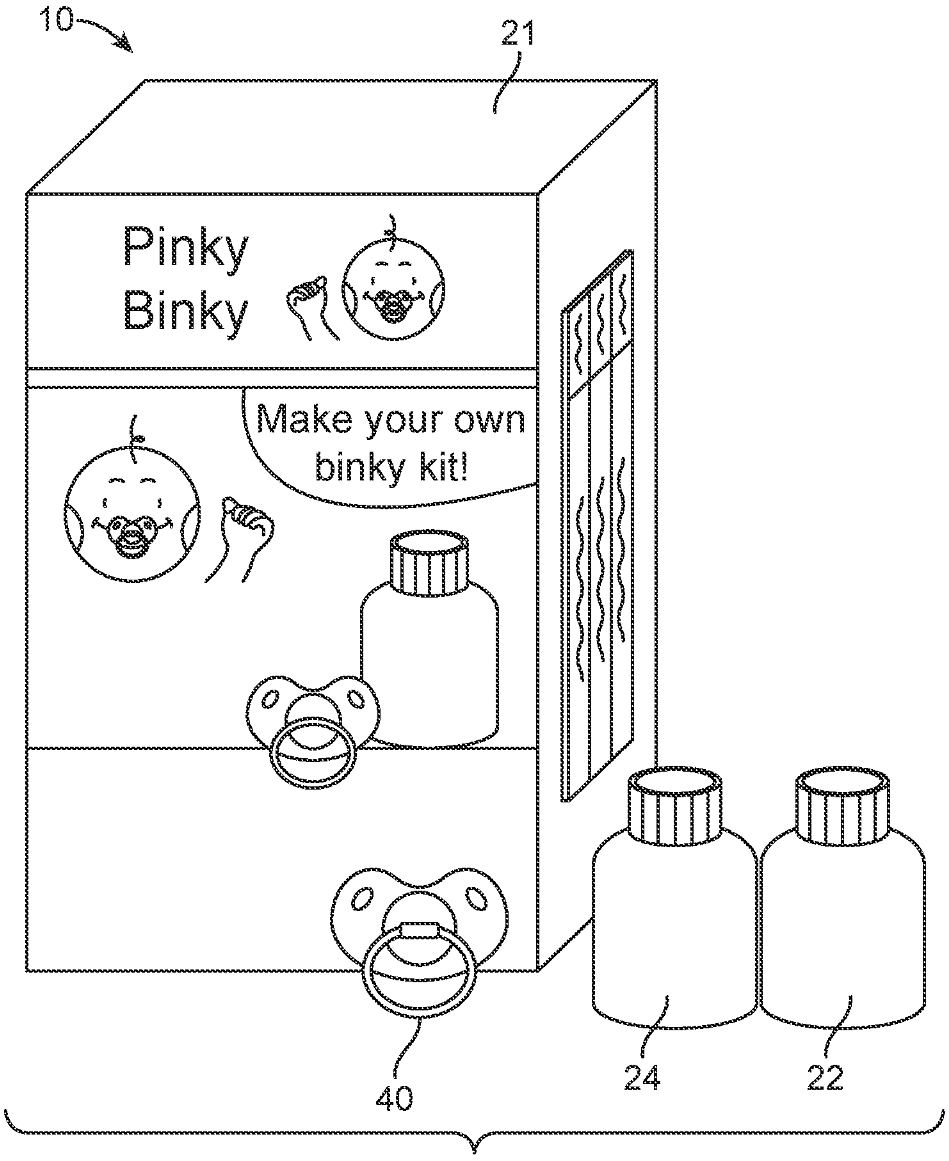
FIG. 2 shows an enlarged view of the kit assembly 20 including a silicone container 22, a mold container 24, and a base 28

Referring now to the drawings, where the present invention is generally referred to with numeral 10, it can be observed that it basically includes a Assembly1, Assembly2, and aAssembly3 . . . It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The kit assembly 20 includes a silicone container 22 and a mold container 24 in a box 21. The box 21 may be a packaging box. In one of the preferred embodiments, the box 21 may have a cuboid shape. Other embodiments may include a box 21 with other shapes such as cubic, spheric, polygonal prism, irregular shapes, or any other suitable shape. The box 21 may be customizable to have a shape of a baby pacifier or any other suitable design. The box 21 may have indicia showing the ingredients and content of the kit. The list of the ingredients may be located at a lateral side of the box 21. The box 21 may also include the instructions of operation for the kit. The instructions may be printed on a rear side of the box 21. In one embodiment, the box 21 may be made of cardboard. It also may be suitable to have the box 21 made of paper, plastic, foam, wood, or any other suitable material for box packagings. In one embodiment, the box 21 may have a height of 2 inches, a length of 5 inches, and a width of 1 inch. It should be understood that the box 21 may have any other suitable shape. The box 21 may receive the silicone container 22 and the mold container 24 thereinside.

Figure 3:
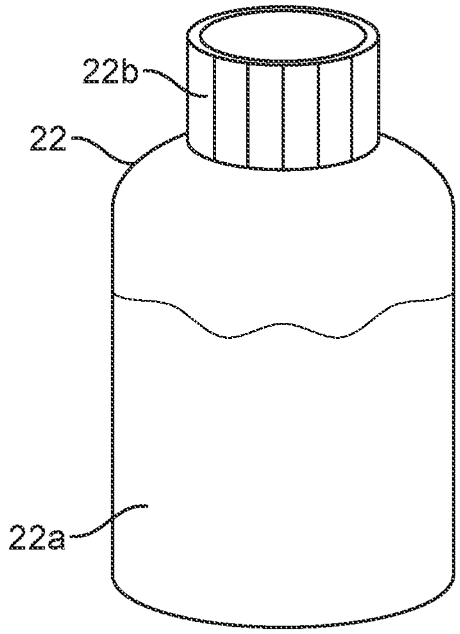
FIG. 3 illustrates an enlarged view of the silicone container 22 showing the silicone 22*a* inside the silicone container 22.

Best observed in FIG. 3, the silicone container 22 may have a substantially cylindrical shape with a rounded top portion. It should be understood that the silicone container 22 may have any other suitable shapes. The silicone container 22 may have an interior hollow. The silicone container 22 may be filled with silicone 22*a* for selling. Preferably, the silicone 22*a* may be liquid silicone. The silicone 22*a* may be a nontoxic silicone. The silicone container 22 may include a silicone lid 22*b*. The silicone lid 22*b* may cooperate with an opening of the silicone container 22 to removably close the silicone container 22. The silicone container 22 may be a threaded lid or any other suitable lid.

Figure 4:
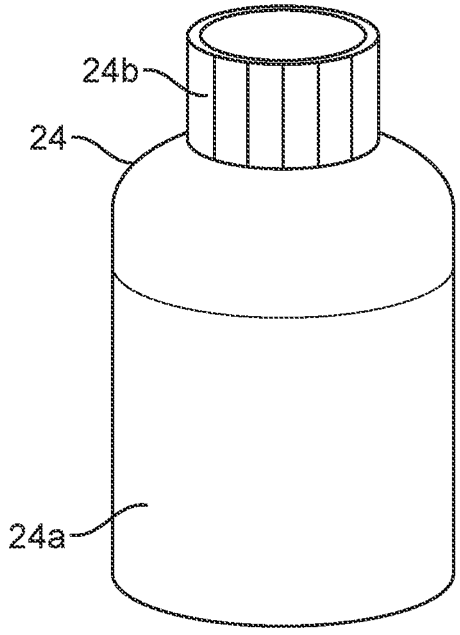
FIG. 4 is a representation of the mold container 24 containing the mold 24*a*.
Figure 5:
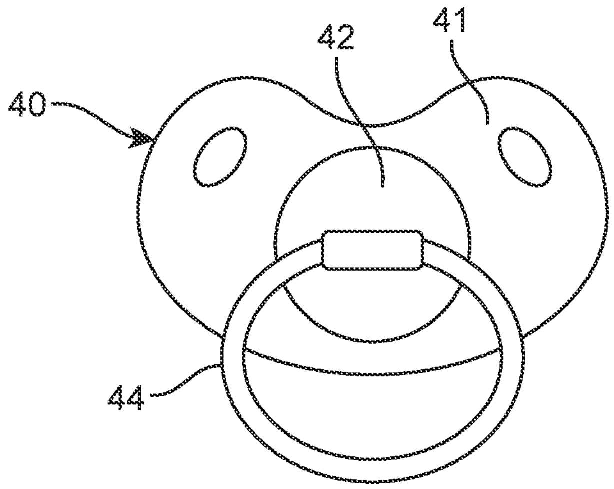
FIG. 5 is a detailed view of the base 28 showing the speaker 29 embedded therein.

Referring now to FIG. 4, the mold container 24 may have a substantially cylindrical shape. It also may be suitable to have the mold container 24 with other shapes such as cuboid, polygonal prism, or the like. The mold container 24 may have an interior hollow. The mold container 24 may have a mold 24*a* inside. The mold 24*a* may be a soft mold made of foam, silicone, or any other suitable material. The mold 24*a* may be a deformable mold. The mold container 24 may include a mold lid 24*b*. The mold lid 24*b* may allow to close the mold container 24. The mold lid 24*b* may be a threaded lid or any other suitable lid.

The base assembly 40 may include base 41 and a handling portion 44. The base 41 may have a bottom portion to receive a nipple pacifier therein. The base 41 may be made of plastic, foam, or any other suitable material. The base 41 may be made of a nontoxic material. The handling portion 44 may be hingedly connected to a top portion of the base 41. The handling portion 44 may have a circular shape. It also may be suitable to have the handling portion 44 with other suitable shapes. The base assembly 40 may further include a speaker 42. The speaker 42 may be a programmable speaker configured to be programmed with a voice or a heartbeat of a relative. The speaker 42 may be placed on the top side of the base 41.

Figure 6:
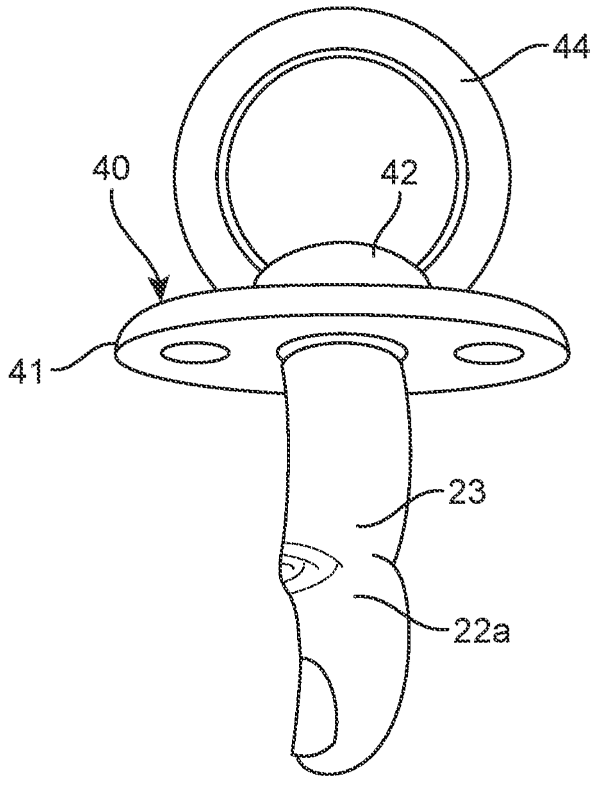
FIG. 6 is an isometric view of soothing device 23 with the silicone 22*a* molded with the shape of a finger of a user.

The instructions may be written on the box 21. The instructions may indicate how to form an infant soothing device such as a pacifier. A user may introduce a finger into the mold container 24 to form a finger mold in the mold 24*a*. The mold 24*a* may have the hollow form of the finger of the user. The user may fill the silicone 22*a* into the mold 24*a* with the shape of the finger. The silicone 22*a* may solidify after a few minutes. The silicone 22*a* may solidify in the shape of the finger mold forming a soothing device 23 with the shape of a user such as a parent. The user may remove the soothing device 23 from the mold 24*a*. The user may secure the soothing device 23 to the bottom surface of the base 41 as illustrated in FIG. 6. The soothing device 23 may be attached to the base 41 using a non toxic glue, or any other suitable attaching method known in the art. The mold 24*a* may be used to create customizable pacifiers for babies with a desired shape such as fingers and with customizable and programmable audio.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A customized pacifier creation kit, comprising:

a. a kit assembly including a deformable mold made of foam or silicone stored in a mold container and liquid nontoxic silicone stored in a separate silicone container, said mold is configured to form a finger mold with the form of a finger of a user, wherein the finger mold is filled with the silicone to form an infant soothing device with a shape of the finger;

b. a base assembly including a base and a programmable speaker embedded in the base, said base is configured to be attached to said soothing device upon formation of said soothing device; and c. a box packaging having a cuboid shape storing the mold container and the silicone container.

2. A customized pacifier creation kit, comprising:

a. a kit assembly including a mold container, a box having a cuboid shape, and silicone container, said box has indicia with instructions to create customizable pacifiers, said mold container has a deformable mold made of foam or silicone inside, said silicone container has liquid nontoxic silicone inside, said mold is configured to form a finger mold with the form of a finger of a user, wherein the finger mold is filled with the silicone to form an infant soothing device with a shape of the finger; and b. a base assembly including a base, a handling portion hingedly connected to a top side of the base, and a programmable speaker embedded in the base, said base is configured to be attached to said soothing device upon formation of said soothing device, wherein the base has a flat bottom portion to receive the infant soothing device therein, wherein the speaker is a programmable speaker configured to be programmed with a voice.

3. A customized pacifier creation kit, consisting of:

a. a kit assembly including a mold container, a cuboid box, and silicone container, said silicone container is a cylindrical container with a first lid, said mold container has a cylindrical shape, said mold container has a second lid, said box has indicia with instructions to create customizable pacifiers, said mold container has a deformable mold made of foam or silicone inside, said silicone container has liquid nontoxic silicone inside, said mold is configured to form a finger mold with the form of a finger of a user, wherein the finger mold is filled with the silicone to form an infant soothing device with a shape of the finger; and b. a base assembly including a base, a handling portion hingedly connected to a top side of the base, and a programmable speaker embedded in the base, said base is configured to be attached to said soothing device upon formation of the soothing device, wherein the base has a flat bottom portion to receive the infant soothing device therein, wherein the programmable speaker is configured to be programmed with a voice.

* * * * *